No. 711,586. Patented Oct. 21, 1902.
O. N. NORD.
WRAPPING MACHINE.
(Application filed Aug. 14, 1899.)
(No Model.) 13 Sheets—Sheet 1.
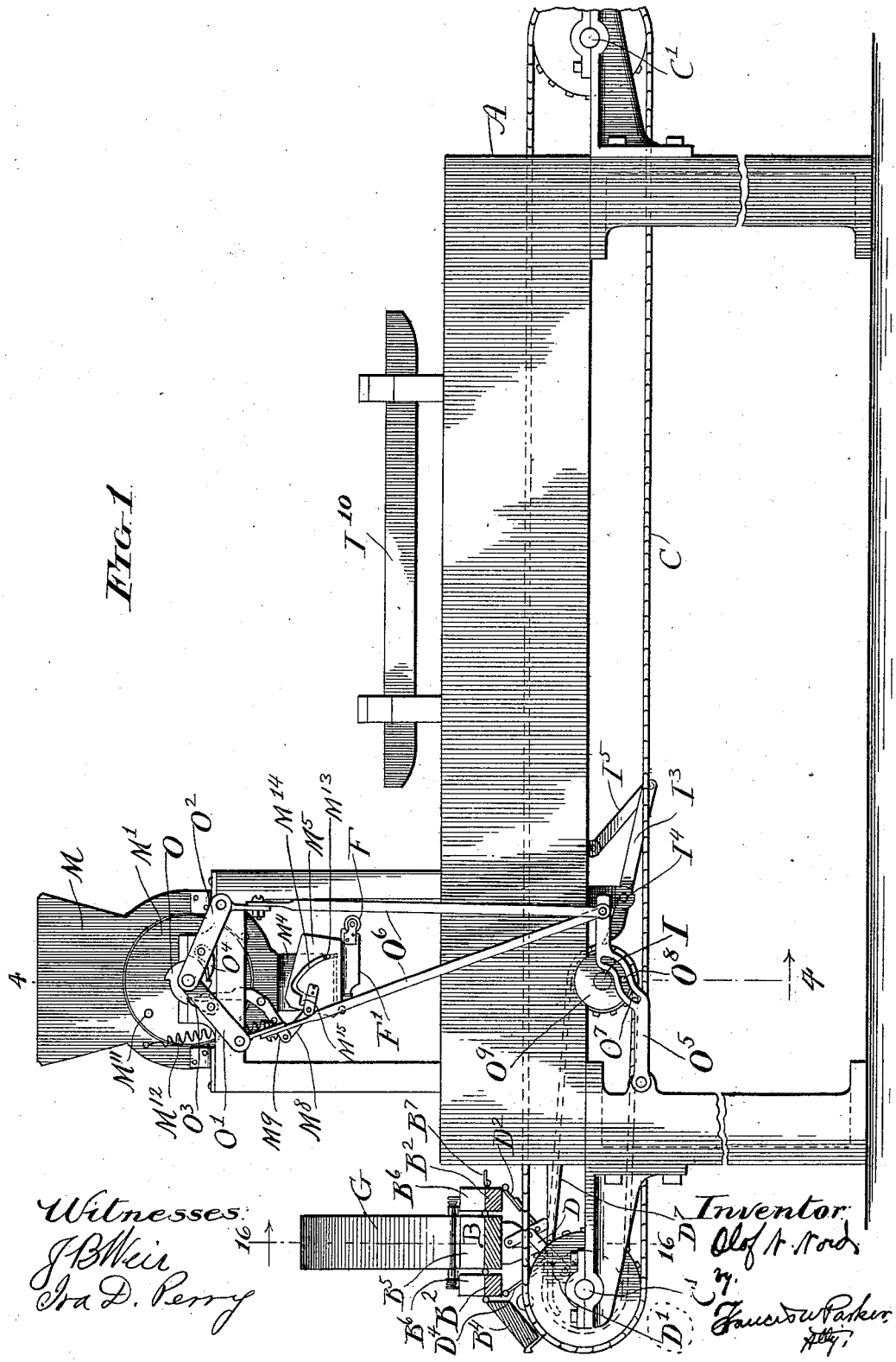

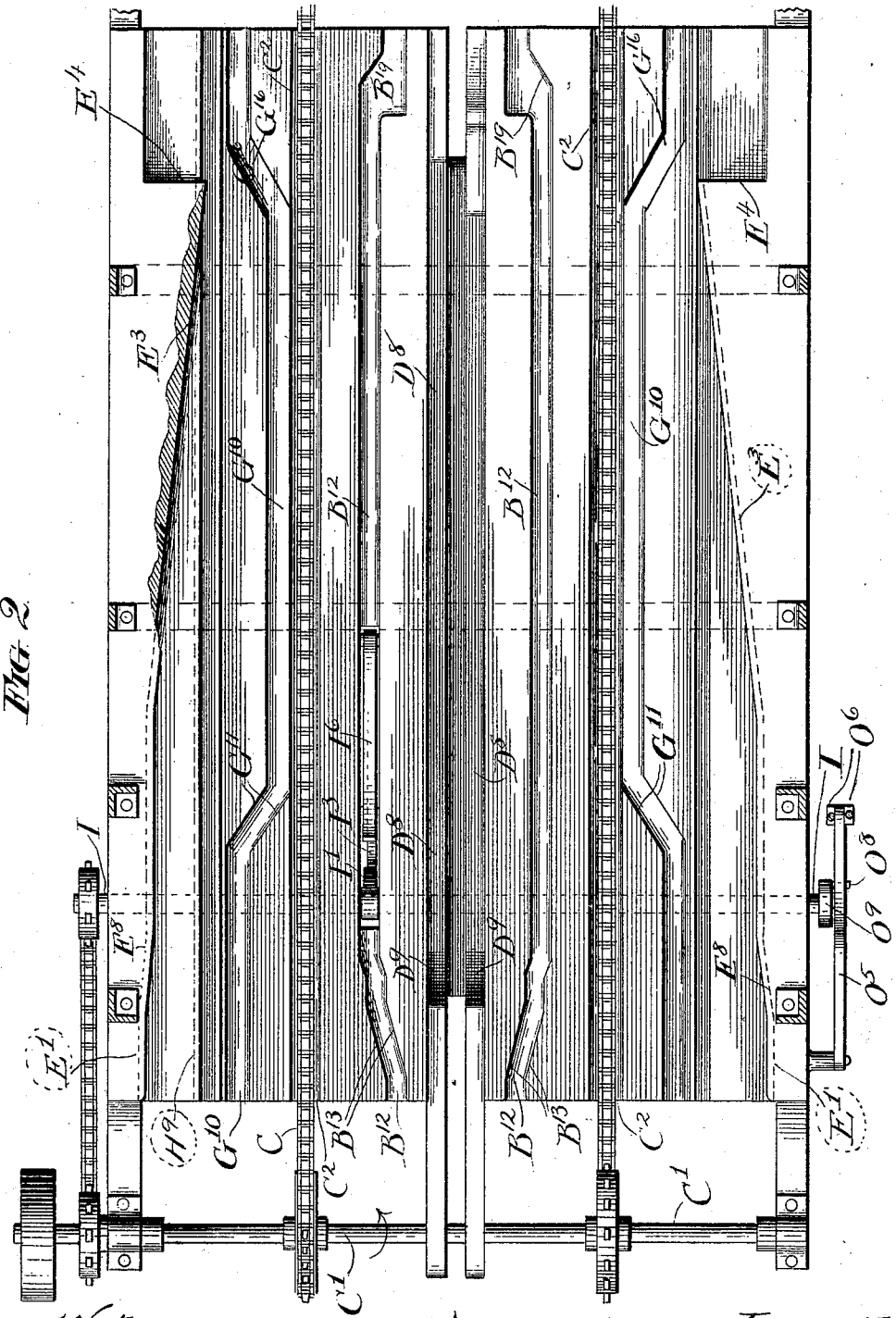

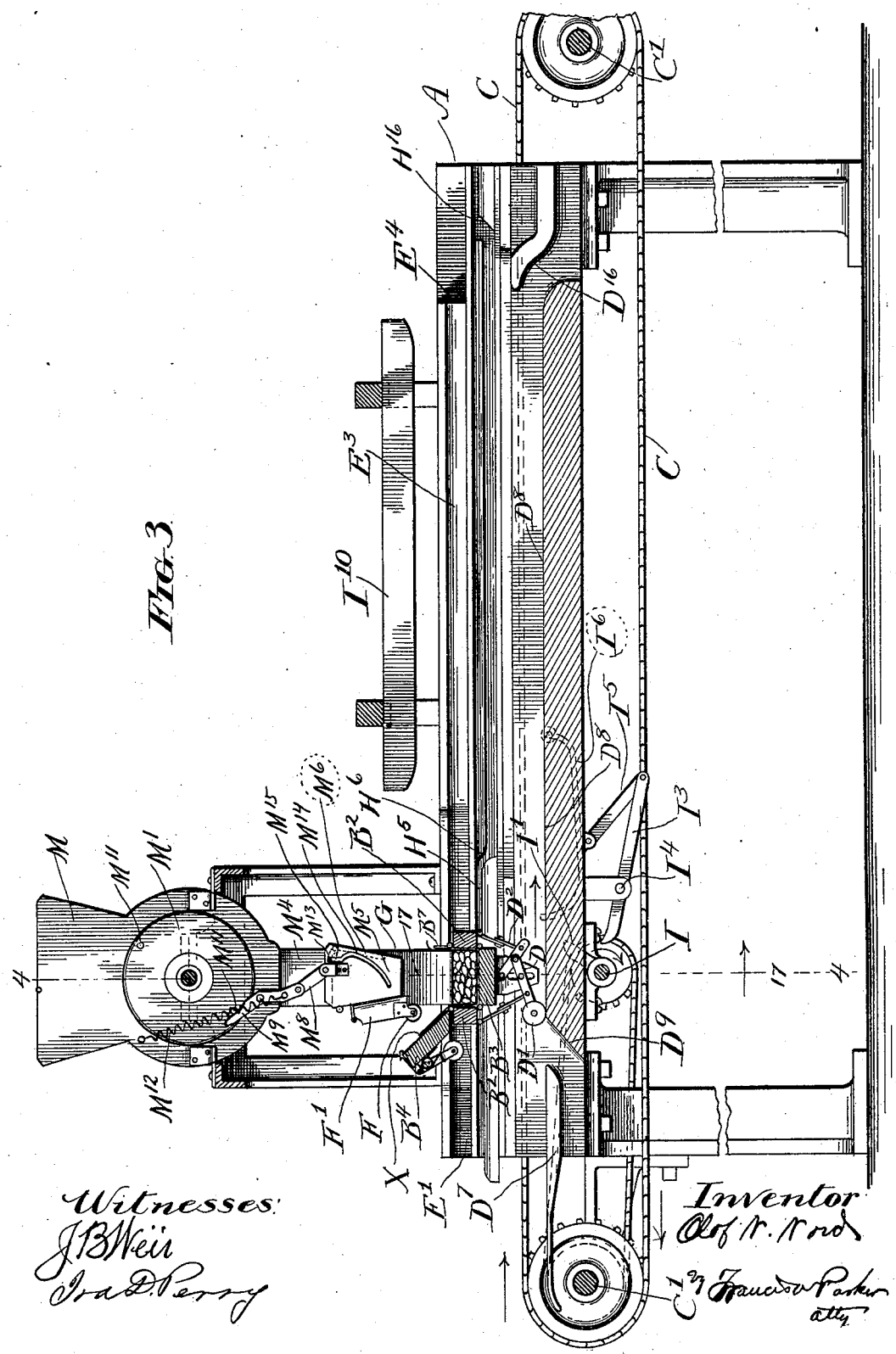

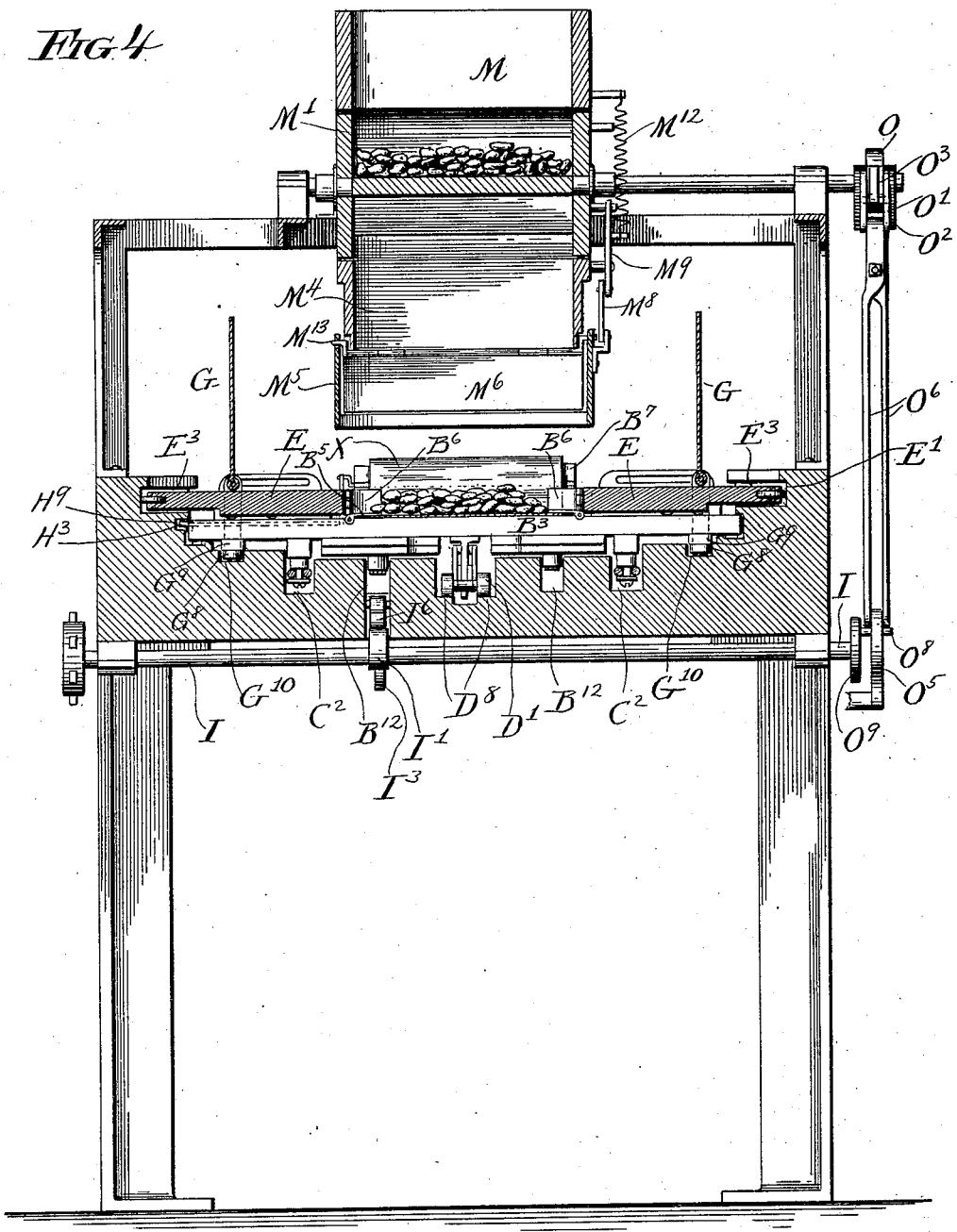

No. 711,586. Patented Oct. 21, 1902.
O. N. NORD.
WRAPPING MACHINE.
(Application filed Aug. 14, 1899.)
(No Model.) 13 Sheets—Sheet 5.
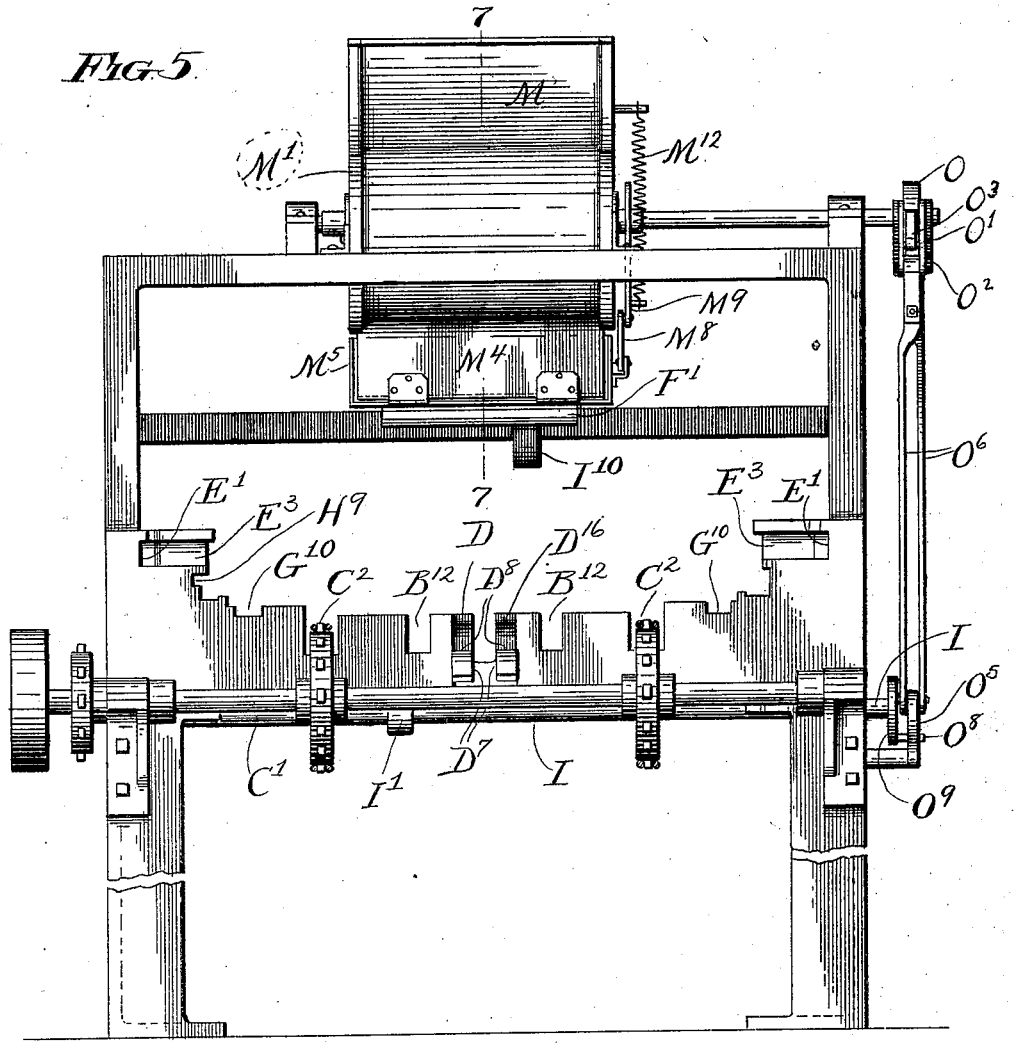
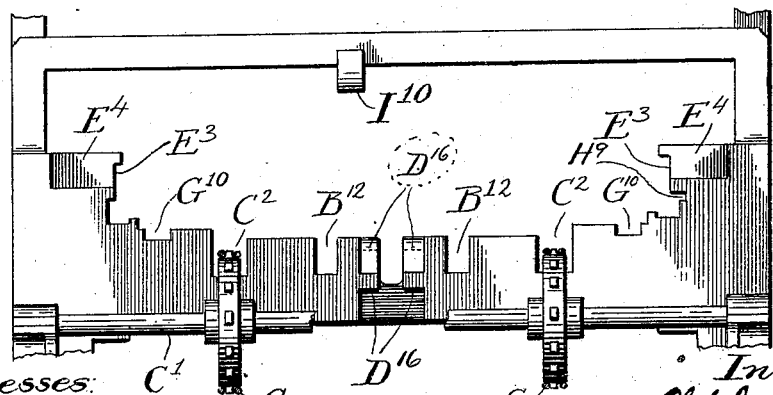

No. 711,586. Patented Oct. 21, 1902.
O. N. NORD.
WRAPPING MACHINE.
(Application filed Aug. 14, 1899.)
(No Model.) 13 Sheets—Sheet 6.
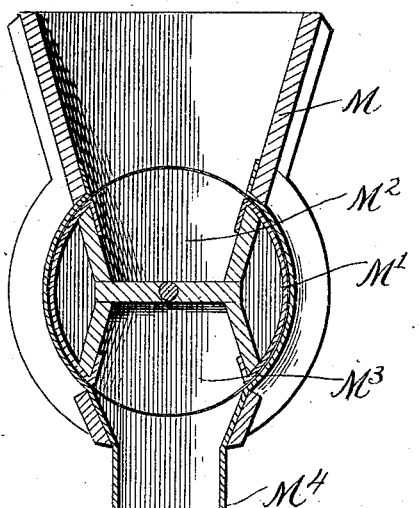
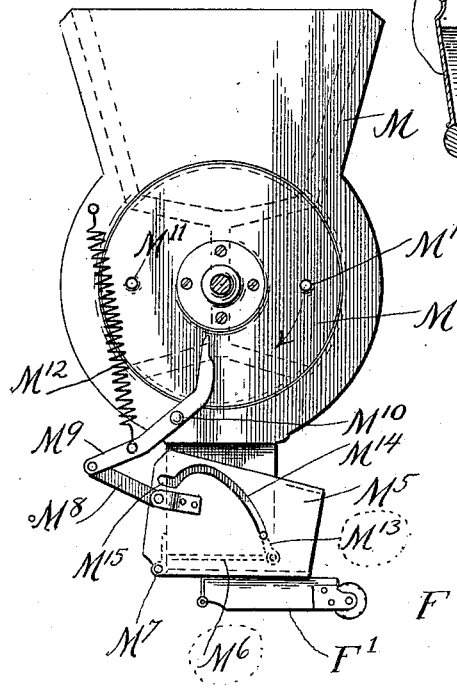
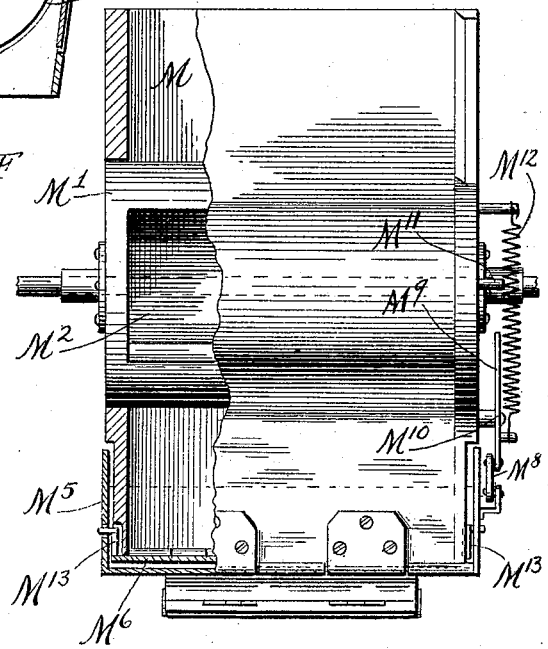
Witnesses:
Inventor:
Olof N. Nord

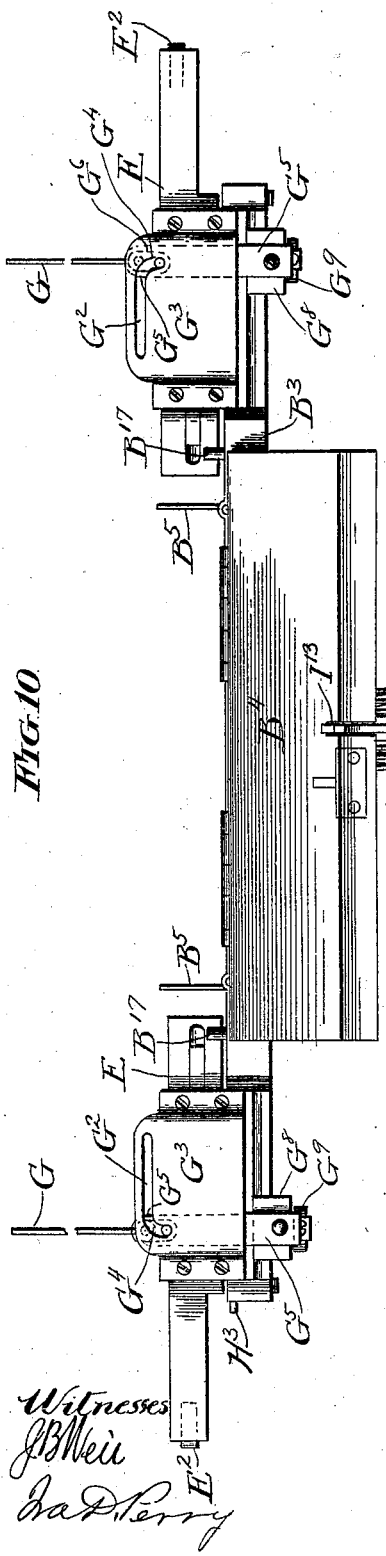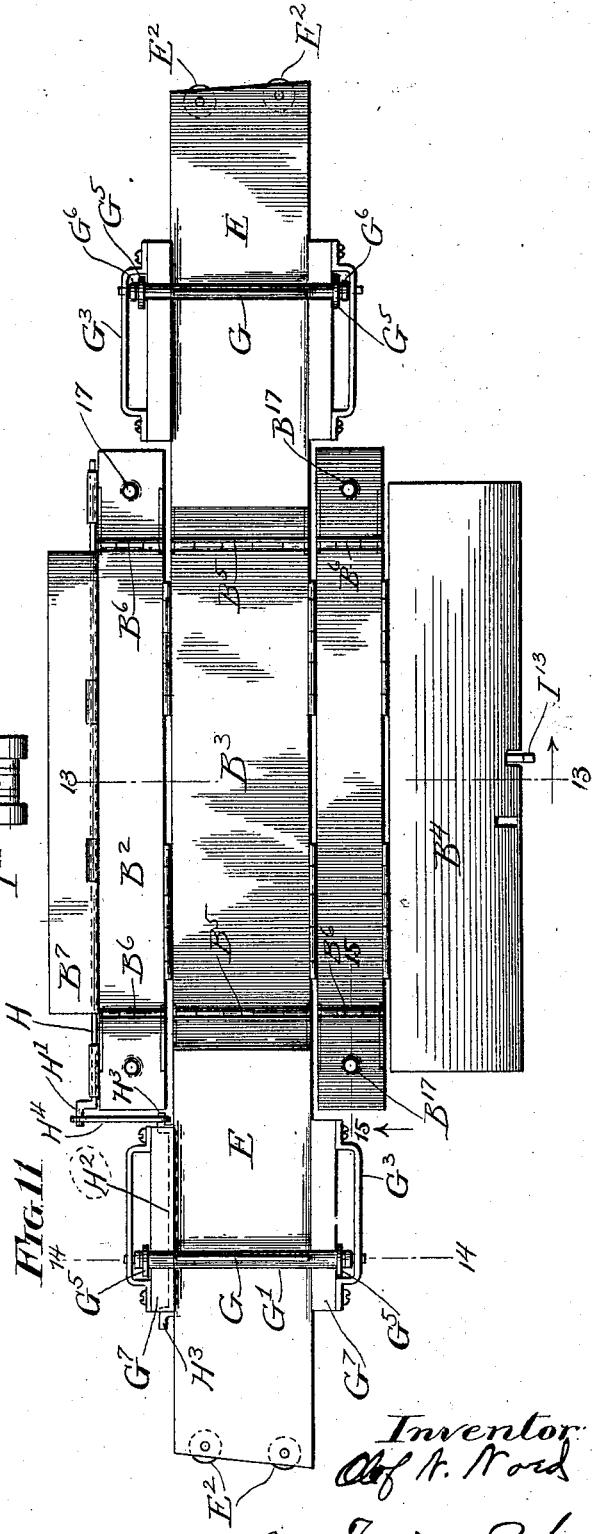

No. 711,586. Patented Oct. 21, 1902.
O. N. NORD.
WRAPPING MACHINE.
(Application filed Aug. 14, 1899.)
(No Model.) 13 Sheets—Sheet 8.
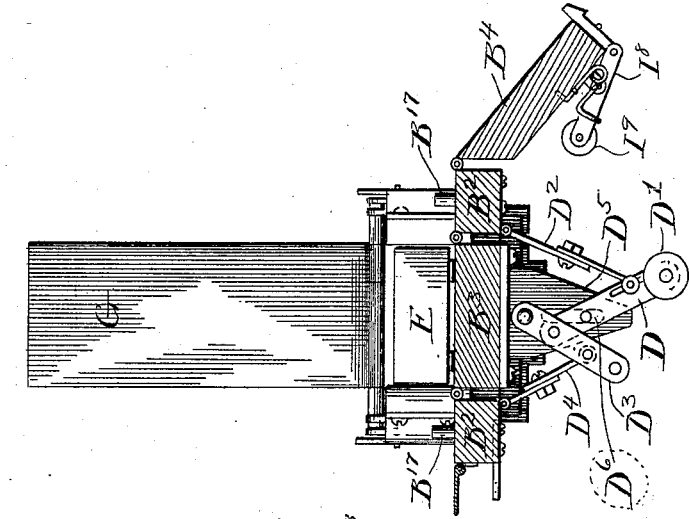
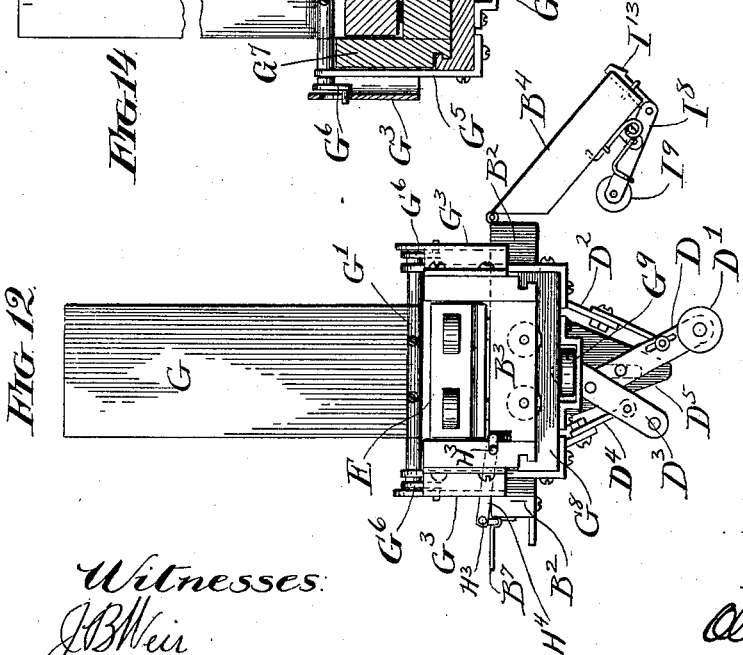
Witnesses:
J B Weir
Ira D Perry
Inventor:
Olaf N Nord
by Francis W Parker
Atty.
THE NORRIS PETERS CO., PHOTO-LITHO., WASHINGTON, D. C.

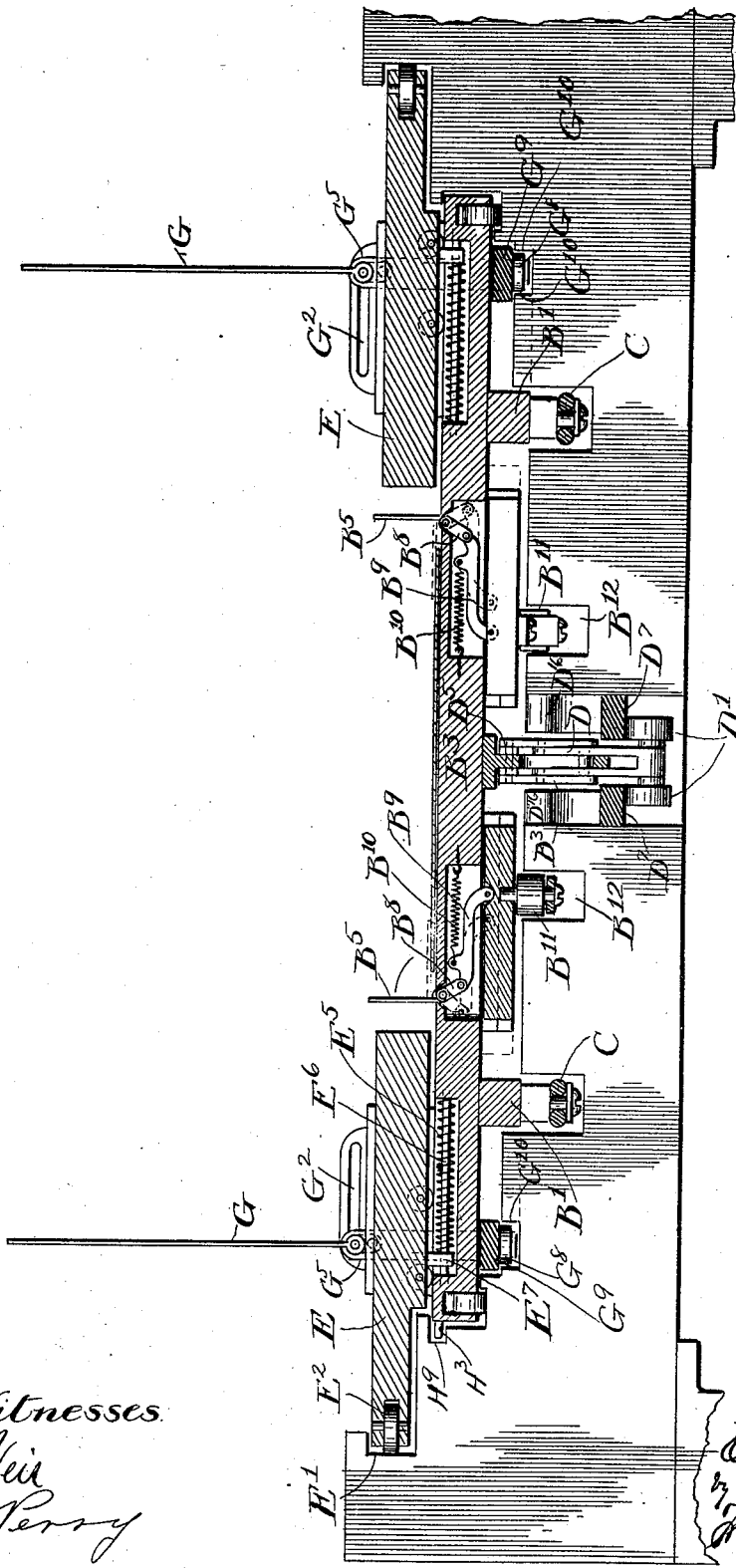

No. 711,586.
O. N. NORD.
WRAPPING MACHINE.
(Application filed Aug. 14, 1899.)
(No Model.)
Patented Oct. 21, 1902.
13 Sheets—Sheet 10.
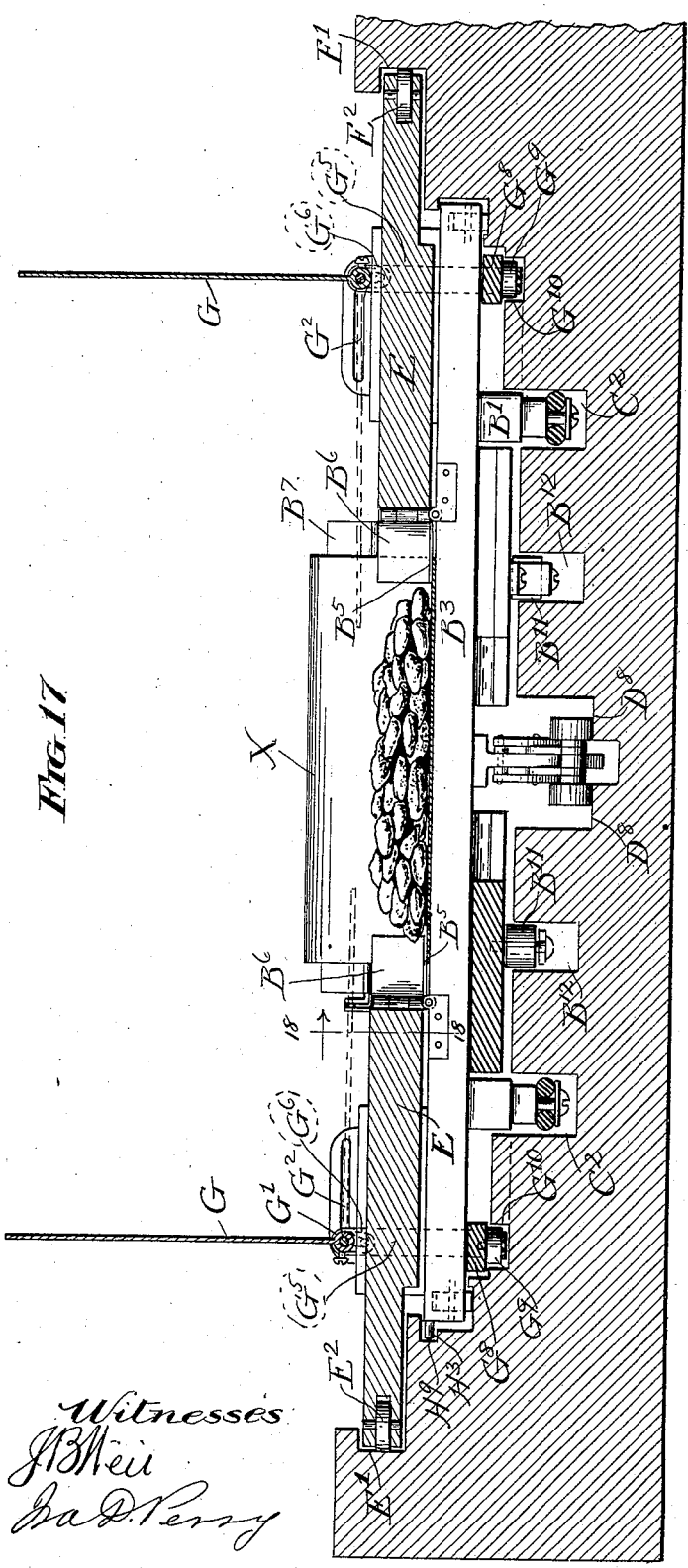
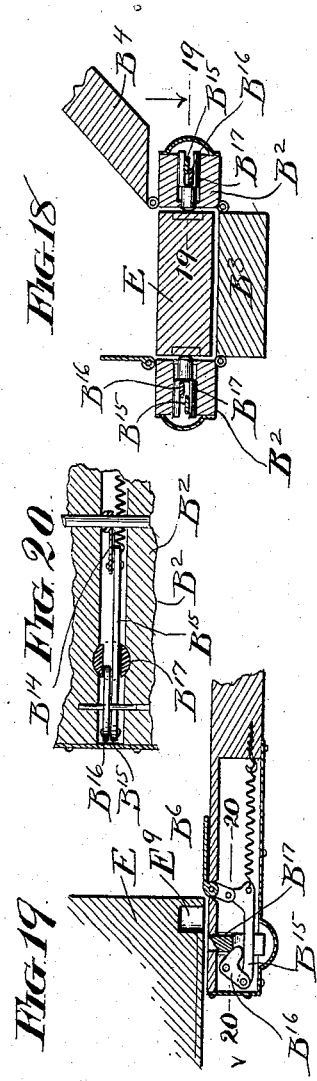

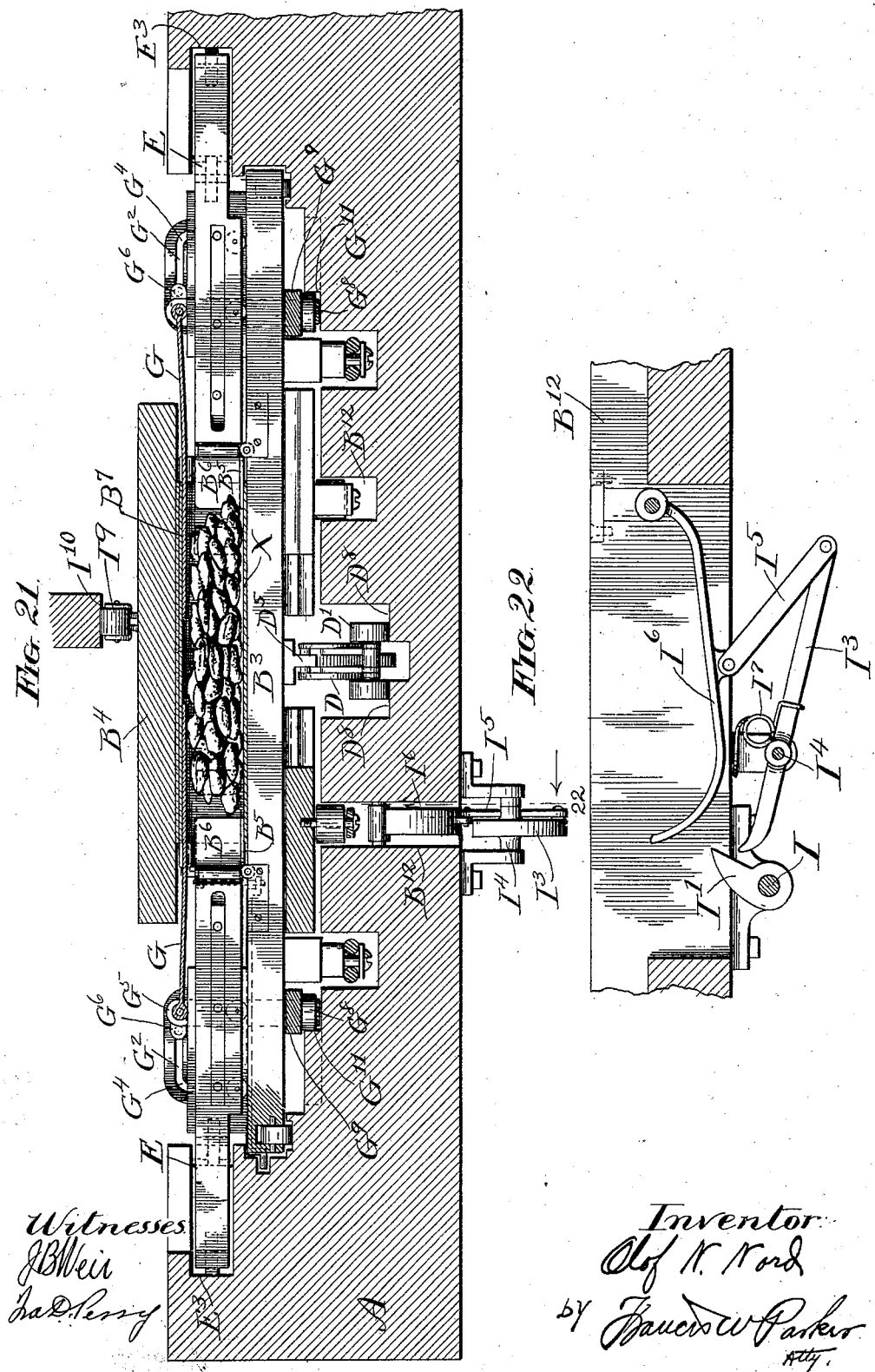

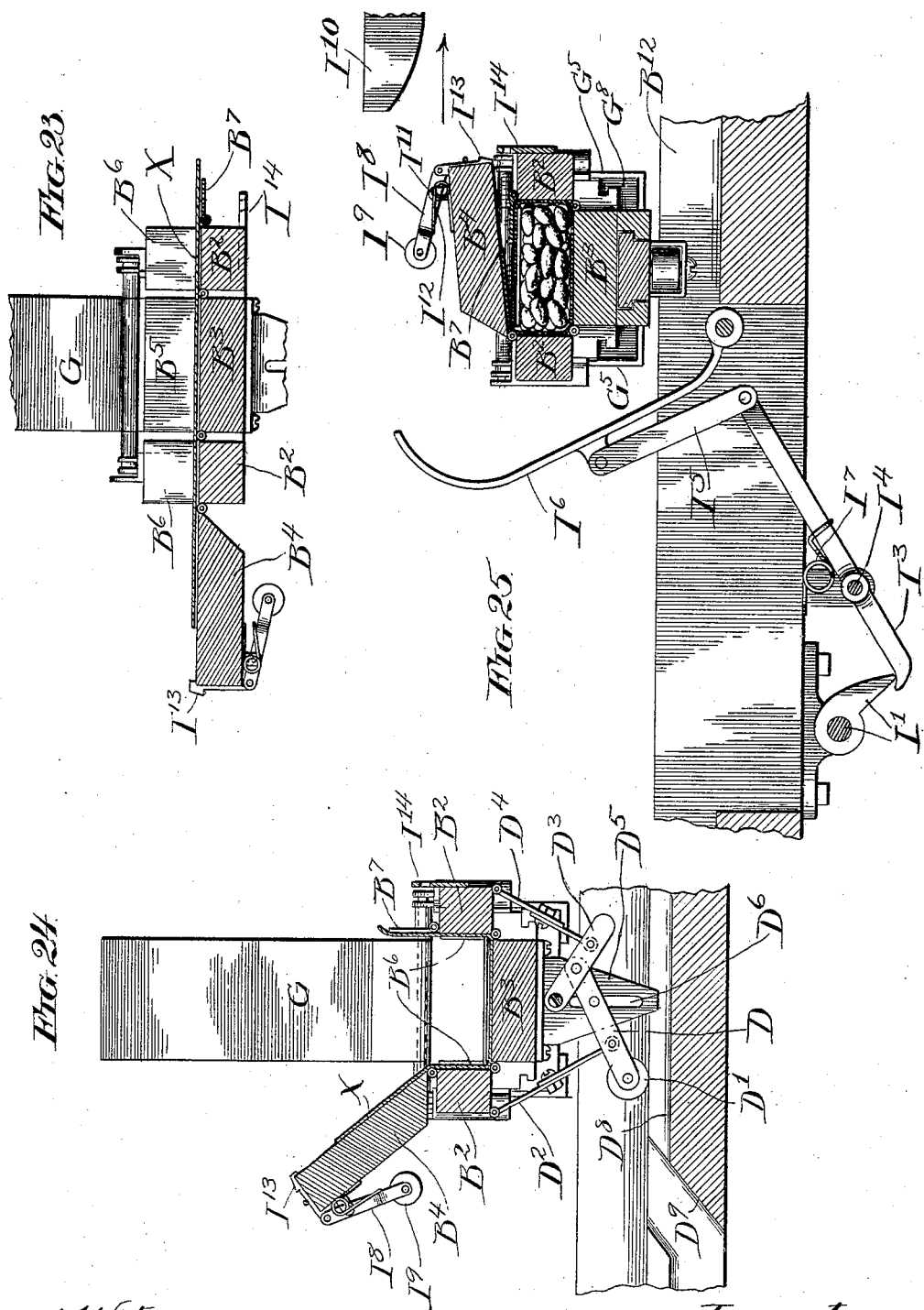

No. 711,586. Patented Oct. 21, 1902.
O. N. NORD.
WRAPPING MACHINE.
(Application filed Aug. 14, 1899.)
(No Model.) 13 Sheets—Sheet 13.
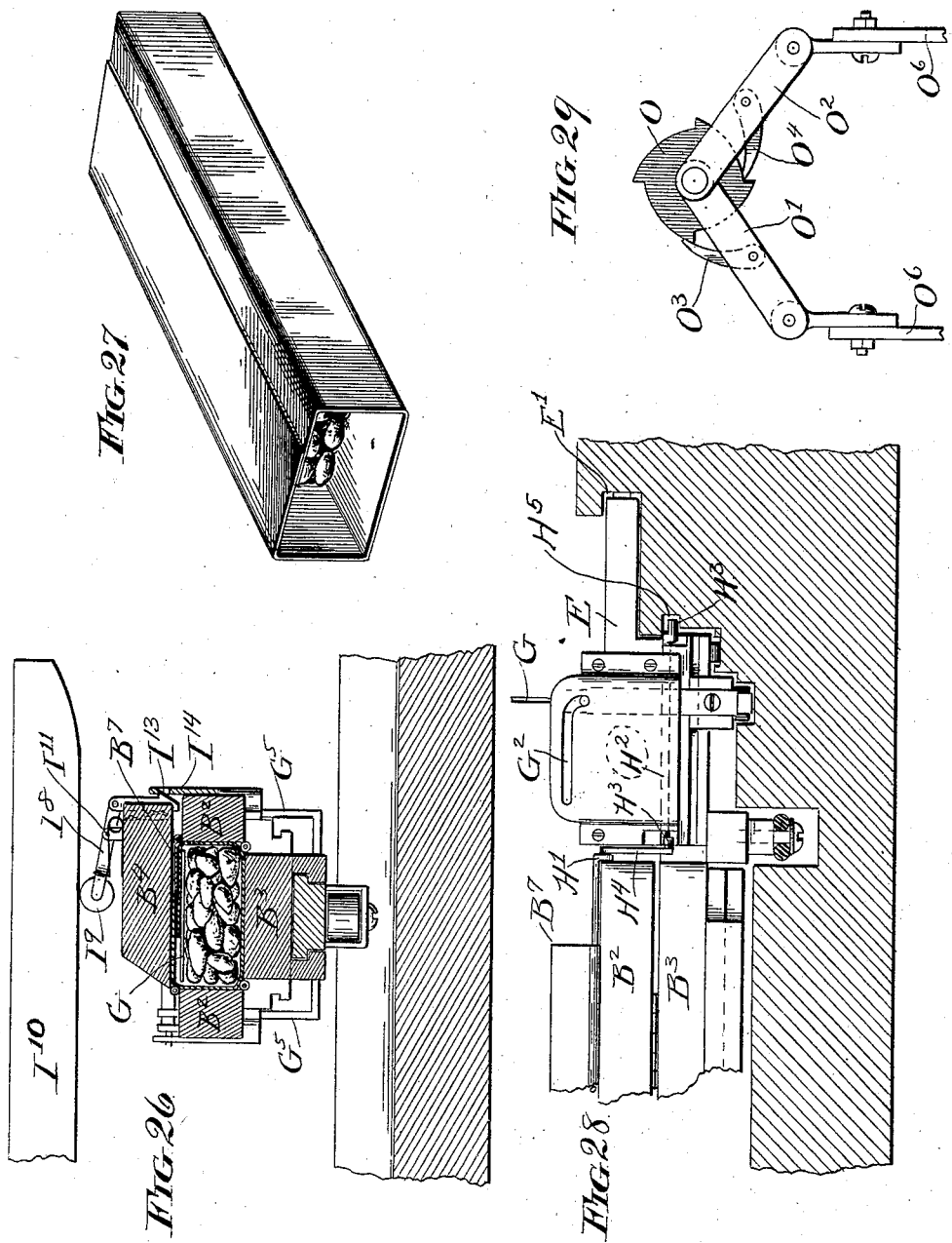
Witnesses:
J B Weir
Ira D. Perry
Inventor
Olof N. Nord
by Frederick W. Parker
Atty.
THE NORRIS PETERS CO., PHOTO-LITHO., WASHINGTON, D. C.

UNITED STATES PATENT OFFICE.

OLOF N. NORD, OF CHICAGO, ILLINOIS, ASSIGNOR TO JOHN H. LESLIE, OF CHICAGO, ILLINOIS.

WRAPPING-MACHINE.

SPECIFICATION forming part of Letters Patent No. 711,586, dated October 21, 1902.

Application filed August 14, 1899. Serial No. 727,178. (No model.)

*To all whom it may concern:*

Be it known that I, OLOF N. NORD, a citizen of the United States, residing at Chicago, in the county of Cook and State of Illinois, have invented a certain new and useful Improvement in Wrapping-Machines, of which the following is a specification.

My invention relates to wrapping-machines, and has for its object to provide a new and improved machine of this description.

My invention is illustrated in the accompanying drawings, wherein—

Figure 1 is a side view of a machine embodying the invention. Fig. 2 is a plan view, with parts removed, of the device shown in Fig. 1. Fig. 3 is a longitudinal sectional view of Fig. 1. Fig. 4 is a sectional view on the line 4 4, Fig. 1. Fig. 5 is an end view of the machine shown in Fig. 1. Fig. 6 is an end view, with parts omitted, as seen from the discharge end of the machine. Fig. 7 is a sectional view on the line 7 7, Fig. 5, showing the interior arrangement of the feeding device. Fig. 8 is a side view of the feeding device. Fig. 9 is an end view of the feeding device, with parts broken away. Fig. 10 is a side view of the box and associated parts in which the material to be wrapped is received. Fig. 11 is a plan view of the device shown in Fig. 10. Fig. 12 is an end view of the device shown in Fig. 10. Fig. 13 is a section on the line 13 13, Fig. 11. Fig. 14 is a section on the line 14 14, Fig. 11. Fig. 15 is a section on the line 15 15, Fig. 11. Fig. 16 is a longitudinal section through the box shown in Fig. 11, said box being open and in position upon the supporting-table. Fig. 17 is a view similar to Fig. 16, showing the box partly folded and in position to receive the material. Fig. 18 is a section on line 18 18, Fig. 17. Fig. 19 is a section on line 19 19, Fig. 18. Fig. 20 is a section on line 20 20, Fig. 19. Fig. 21 is a view similar to Fig. 17, showing the position of the parts when the box-lid is first closed. Fig. 22 is a section, with parts omitted, on line 22 22, Fig. 21. Fig. 23 is a cross-section through the box for receiving the material to be wrapped when said box is flattened out to receive the wrapper X. Fig. 24 is a section similar to Fig. 23, showing the box partially folded and ready to receive the material. Fig. 25 is a section similar to Fig. 24, showing the mechanism for closing the lid of the box. Fig. 26 is a view similar to Fig. 25, showing the box completely closed. Fig. 27 is a view of the folded package before the ends are closed. The box is here shown with its ends open as such box is received from the machine. Fig. 28 is a view in part sections showing a side elevation of one end of the box into which the material is received. Fig. 29 is an enlarged view of the mechanism which operates the feeding-cylinder.

Like letters refer to like parts throughout the several figures.

My invention is particularly adapted to be used in wrapping loose bulky material which cannot be formed into any regular shape before being received into the wrapping-machine—such, for example, as dried fruit and the like. In wrapping such material it is necessary to separate the material into portions and deposit them in a suitable wrapper and shape the material in some manner, so that the wrapper can be properly folded therearound.

One of the objects of my present invention is to provide a machine by means of which this result can be obtained and the material of whatever nature be wrapped into packages of a substantially uniform shape and containing a specified amount—such as one pound, two pounds, &c.—thus forming the material in a convenient shape for handling.

Referring now to Fig. 1, which illustrates a machine embodying my invention, a suitable table A is provided, along which are moved a series of boxes or receptacles B. In order to avoid complicating the drawings, I have simply shown one of these receptacles; but it is of course evident that any desired number may be used. These receptacles B are provided with suitable means for moving them along the table. As illustrated in the drawings, said boxes are connected with the power-transmitting devices or chains C C, which engage suitable sprocket-wheels upon the shafts C' at each end of the table. As illustrated in the drawings, said table is provided with suitable grooves $C^2$ for the chains C', and the receptacle B is provided with the projecting parts B', which engage said chains, as shown, for example, in Fig. 16. The receptacle B is made up of a series of parts jointed or connected together in some suitable manner, the parts arranged so that they may be flattened out when the wrapper is placed therein and then doubled or folded before the material to be wrapped is inserted. In Fig. 1 I have shown the receptacle when flattened out and just before the wrapper is placed in position, and in Fig. 23 I have shown said receptacle with the wrapper in place. This receptacle, as herein illustrated, is provided with the sides $B^2$, hinged to the bottom $B^3$, and the top $B^4$, hinged to one of said sides. After the wrapper is placed in position it must be held in place, so that it will not be displaced while the material is being formed or pressed into the proper shape. This result is attained by providing suitable holding devices on the bottom and sides of the box, which engage the wrapper before the material is placed therein. As illustrated in the drawings, these holding devices consist of the flaps $B^5$ $B^5$, attached at each end of the bottom of the box, and the flaps $B^6$ $B^6$, attached to the sides of the box, one at each end of said sides. There is also a folding-flap $B^7$ attached to one of said sides and adapted to fold the upper edge of the wrapper. After the wrapper is in position in the box, as shown in Fig. 23, the box is moved forward along the table by suitable operating mechanism, and the box is provided with suitable engaging devices which engage parts on the table so as to fold the box and operate the various holding devices and the like. After the wrapper is in position the first operation as the box is moved along is to move the holding devices or flaps $B^5$ downwardly, so as to engage the wrapper on the bottom of the box. This result is obtained by the mechanism illustrated in Fig. 16. By referring to this figure it will be noted that said flaps $B^5$ are provided with angular projecting parts or cranks $B^8$, which extend downwardly into the bottom of the box and to which are connected the reciprocating pieces $B^9$, provided with the retracting-springs $B^{10}$. These reciprocating pieces are connected with the engaging parts or rollers $B^{11}$, which work in grooves $B^{12}$ in the table. These grooves are provided with diagonal cam or engaging faces $B^{13}$, (see Fig. 2,) which engage the rollers $B^{11}$ and move them so as to fold said flaps, as shown in dotted lines in Fig. 16. It is necessary to fold the sides of the box before operating the flaps or holding devices thereon to permit the slack in the wrapper to be taken up before it is attached to the box. As the box moves forward along the table the actuating mechanism which folds the sides is operated. This actuating mechanism, as illustrated, consists of an arm D, provided with an engaging end D', which in this case consists of friction-rollers, said arm being connected by a rod $D^2$ with one side of the box and being engaged to a pivoted link $D^3$, which is in turn connected by the rod $D^4$ with the other side of the box. (See Fig. 24.) Attached to the bottom of the box is a downwardly-projecting piece $D^5$, to which the arm D is movably attached. This result is attained in the drawings by splitting said arm, the downwardly-projecting part $D^5$ being received between said split. A slot $D^6$ is made in said part $D^5$, so as to allow the arm D to move up and down. I also prefer to provide two links $D^3$, as shown, for example, in Fig. 16. When the box first passes onto the table, the end of the arm D engages the piece $D^7$ from beneath, so as to prevent the box from being folded. The table is provided with a suitable groove $D^8$ for said arm and the parts associated therewith. This groove is provided with the inclined or cam face $D^9$, (see Fig. 3,) which engages the end of the arm D as the box moves along and moves said arm upwardly to the position shown in Figs. 3 and 24. The rods $D^2$ and $D^4$ are moved by the arm D and force the sides of the box upwardly to the position shown in Fig. 24. After the sides of the box are folded the holding devices or flaps $B^6$ are operated so as to grip or hold the wrapper. Any suitable mechanism to produce this result may be used, and, as herein shown, each flap $B^6$ is provided with a crank $B^{14}$, (see Fig. 15,) which is connected by the bell-crank levers $B^{15}$ $B^{16}$ with the pin $B^{17}$, said mechanism being contained within a hollow portion of the side pieces, as shown. A suitable retracting-spring $B^{18}$ is connected with each bell-crank lever $B^{15}$, so as to move the flaps to the position shown in full lines in Fig. 15 when the box is open. When the sides of the box are folded, the pins $B^{17}$ engage the plungers E at the ends of the box and the parts are moved to close the flaps $B^6$, as shown in Fig. 19, so that they will clamp the wrapper and hold it in place. The box is now in the position shown in Figs. 3 and 24 and is ready to receive the material to be wrapped. As the box is moved forward the upper edge of the wrapper is provided with a suitable coating of adhesive material, so that the wrapper when folded will be held in the desired shape. This coating of adhesive material is placed upon the wrapper by means of a roller F, attached to the feeding mechanism and connected with a reservoir F', containing the adhesive material, the wrapper being engaged between said roller and the top of the box as the box is moved forward. When the material to be wrapped consists of large irregular lumps, as in the case of dried fruit, it is necessary to provide a smooth face upon which the two edges of the wrapper may be folded in order that a proper adhesion of the two edges of the wrapper, and hence a properly-shaped package, may be obtained. This result may be obtained in any desired manner, and as shown in the drawings I provide two flat strips G G, which normally stand in a vertical position, as shown in Fig. 17, but which are adapted to be folded downwardly on top of the material in the box before the top or lid is closed. These flat strips must of course be out of the way when the box is being folded, and must then be moved into position before the top or lid is closed. As illustrated in the drawings, these flat strips are connected to suitable rods G', which are rotatably mounted in the braces G$^5$, and are provided with cranks G$^6$, having pins attached thereto, which project through the slots G$^2$ in the side plates G$^3$. These slots are curved downwardly at their outer ends G$^4$, as shown, for example, in Fig. 10. Said side plates are connected with the pieces G$^7$. The braces G$^5$ are connected with the reciprocating piece G$^8$, to which is connected a downwardly-projecting piece G$^9$, which in the present instance is shown as a friction-roller. The pieces G$^7$ are normally stationary, and the reciprocating pieces G$^8$ are movable with relation thereto, as are also the plungers E. It will be noted that each end of the box is provided with the construction just described. It will be noted that the downwardly-projecting parts or rollers are received into grooves G$^{10}$ in the table. (See Fig. 2.) These grooves are provided with beveled or cam faces G$^{11}$, which engage the rollers G$^9$, so as to reciprocate the parts G$^8$. This movement of the parts G$^8$ moves the flat strips and the rods to which they are connected inwardly. During this movement the cranks on the ends of said rods are held from moving forward by the curved end G$^4$ of the slots G$^2$ until the rods G' are rotated, so as to move the flat strips downwardly into the position shown in dotted lines in Fig. 17, said strips being then moved toward each other, so as to form a support upon which the folded edges of the package rest. The flap or folding piece B$^7$ is now folded so as to fold one edge of the wrapper down upon the upper face of the flat strips G. As shown in the drawings, the folding-piece B$^7$ is connected with a suitable rod H, provided at one end with a crank H'. A second rod H$^2$ (see Figs. 11 and 28) is rotatably mounted on some part of the device and is provided at each end with the cranks H$^3$. A link H$^4$ connects the crank H' with one of the cranks H$^3$ of the rod H$^2$. The other crank H$^3$ engages a groove H$^5$ in the table. (See Fig. 28.) This groove H$^5$ at each side of the table is provided with a beveled or cam face H$^6$, (see Fig. 3,) which faces engage the cranks H$^3$ at each end of the box as the box is moved forward. This engagement between the faces H$^5$ and the cranks H$^3$ rotates the rod H$^2$, and this rod is connected by the links H$^4$ with the rod H. The rotation of said latter rod moves the flap or folding piece B$^7$ downwardly to the position shown, for example, in Fig. 25. The parts are now in position for the closing of the top or lid of the box. This closing of the top is brought about by the mechanism shown in Figs. 22 and 25. This mechanism consists of a shaft I, (see Fig. 1,) operatively connected with one of the shafts at the end of the table, so that it will be rotated in a predetermined manner. Connected with this shaft is a projecting piece or cam I', (see Fig. 22,) adapted to engage the end of the lever I$^3$, pivoted at I$^4$ to suitable brackets connected with the table. Said lever is connected by the link I$^5$ with the bent pivoted arm I$^6$, preferably located in one of the slots B$^{12}$. (See Fig. 21.) A suitable retracting-spring I$^7$ is provided for bringing these several arms and levers back to their initial positions, as shown in Fig. 22. The cam I' is so arranged as to engage the lever I$^3$ when the box reaches a predetermined position on the table and suddenly move it, so as to throw the arm I$^6$ upwardly and cause it to engage the top of the box and throw it over to the position shown in Fig. 25. When this operation is performed, it will be remembered that the box is in position to have the lid closed, as hereinbefore described. The projecting part or cam I' then releases the lever I$^3$ and permits the parts to return to the positions shown in Fig. 22. As it is necessary to compress the material in the box into a compact form in order to produce a properly-wrapped package, it is necessary to tightly close the top or lid of the box before compressing said material. This result is obtained by providing the top of the box with the projecting arm I$^8$, preferably provided at its end with a friction-roller I$^9$, which engages the under side of the stationary piece I$^{10}$, (see Figs. 3 and 25,) said engagement forcing the lid tightly down upon the box. The arm I$^8$ is suitably pivoted to the lugs I$^{11}$ at the top of the box and is provided with a suitable retracting-spring I$^{12}$. Connected to the end of the arm I$^8$ is a latch I$^{13}$, adapted to engage the engaging part I$^{14}$ in the side of the box. (See Fig. 25.) When the box passes under the stationary piece I$^{10}$, the several parts are in the positions shown in Fig. 26 and the box is bound together around all of its sides, so that the strain of pressure within is uniformly borne by all the sides. The box is now in position to have the material therein compressed sufficiently to retain its form when removed from the box. This compression may be produced in any desired manner. As herein illustrated I compress the material by means of the plungers E. The ends of said plungers engage suitable grooves E' in the table (see Fig. 17) and are preferably provided with suitable friction-rollers E$^2$. These plungers are normally inoperative while the operations hereinbefore described are being performed; but after the box has been completely closed and is beneath the stationary piece I$^{10}$ the ends of the plungers engage the inclined or cam faces E$^3$. (See Figs. 2 and 3.) This engagement forces said plungers inwardly, so that they engage the material in the box and compress it into a compact mass. The box being firmly bound together and the lid being held down by the stationary piece $I^{10}$ prevents the material therein from expanding laterally, and thus insures its compression into a proper shape. When the box reaches the end of the stationary piece $I^{10}$, the plungers are released and spring back to their initial position, so as to be entirely removed from the box and the wrapper. This result is brought about by providing the offsets $E^4$ at this point, as shown in Figs. 2 and 3. When the ends of the plungers reach these offsets $E^4$, they are freed from the beveled faces of the grooves. A suitable retracting-spring moves them back to their initial position. These retracting-springs are shown in Fig. 16 and consist of a coil-spring $E^5$, mounted upon a rod $E^6$, located in a hollow in the projecting end of the bottom of the box. A projecting part $E^7$ is attached to the plunger and surrounds said rod, so as to engage said spring. As the plunger moves forward the spring is compressed, and hence when said plungers are released the springs throw them back to their initial position. When in this position, the plungers are entirely freed from the wrapper. Before the lid is opened the rollers $G^9$, which operate the flat strips, engage the cam-faces $G^{16}$ of the slots, so as to move said strips away from each other in order that the ends may be near the ends of the package. Just before said rollers $G^9$ reach the point where the flat strips G are moved to their upright position the arm $I^8$ is released and the lid or top of the box springs open. At substantially the same time the rollers on the arm D engage the beveled or inclined face $D^{16}$ of the slot in which they move, so as to move said arm and open the sides of the box. When the sides of the box are opened, the holding devices or flaps $B^6$ are moved to their initial position by the retracting-springs associated therewith. The projections $B^{11}$ engage the inclined faces $B^{19}$ in the slots $B^{12}$, so as to move the holding-flaps $B^5$ to their initial position. The crank $H^3$ engages the beveled face $H^{16}$ of the slot $H^5$ (see Fig. 3) and moves the folding-flap to its initial position. All this opening up of the box and the parts is accomplished practically simultaneously, so that the package is entirely released and the box opened. The package will then be of the shape shown in Fig. 27. This package may then be removed and the ends folded and pasted. The box now returns beneath the table to its initial position to receive another package. During the operation of the device a series of boxes are used, and the several parts are so arranged that the boxes will be filled one after the other, the number used of course depending upon the length of the table and the desire of the user of the machine.

The material to be wrapped may be fed into the boxes by hand or by any suitable mechanism. I have shown one form of feeding device by which this result may be attained. Referring now to Fig. 3, I have shown a hopper M, into which the material is fed. Associated with this hopper is a revolving cylinder or the like $M'$. (See Fig. 7.) This cylinder is provided with two apartments $M^2$ and $M^3$, which are alternately filled with material as the cylinder is rotated. Below this cylinder is a passage-way or chute $M^4$, into which the material in the apartments $M^2$ and $M^3$ is discharged at predetermined times. Movably connected with this chute is an extension $M^5$, which is normally adapted to be folded up, as shown in Fig. 8, so as to be out of the way of the box moving along the table. The chute $M^4$ is provided with a movable bottom $M^6$, which normally holds any material that may be in said chute until the box is directly under the chute. Suitable mechanism is arranged whereby the extension is let down and this bottom suddenly opened, so that the material may drop down into the box while said box is in position under the chute. This result may be obtained by any suitable mechanism. As shown in the drawings, the extension $M^5$ is pivoted at $M^7$ to the chute and is provided with a link $M^8$, pivoted to the extension at one end, said link being pivotally connected to a lever $M^9$ at the other end. This lever is pivoted to the framework of the feeding device at $M^{10}$, and its upper end is in position to be engaged by projections or pins $M^{11}$ on the rotating cylinder $M'$. A suitable retracting-spring $M^{12}$ is associated with the lever $M^9$. The bottom $M^6$ of the chute is provided at each end with cranks $M^{13}$, which engage slots $M^{14}$ in the extension. These slots are made substantially on a circle having its center at the pivoted point $M^7$ of the extension, except at the extreme upper end $M^{15}$. When one of the pins $M^{11}$ engages the lever $M^9$, it moves it so as to straighten out the extension $M^5$, which rotates about its pivotal point $M^7$. During this movement the ends of the cranks $M^{13}$ move along the circular part of the slot $M^{14}$. Just before the extension is straightened out said cranks engage the part $M^{15}$ of the slot and the bottom of the chute is instantly opened. The parts are shown in this position in Figs. 3 and 7. The parts are so arranged that when this occurs the box is beneath the chute and receives the material therein. The paste-reservoir $F'$ is attached to the extension $M^5$. The parts are so arranged that the pin releases the lever $M^9$ after the adhesive material has been placed on the edge of the wrapper by its engagement with the roller F. A retracting-spring then moves the parts back to the position shown in Fig. 8.

It will be seen that material may be placed in the hopper M at any time, and that if it is not received in one of the apartments it will be received on the curved face of the cylinder and forced into said apartments by the engagement with the edge of the hopper as the cylinder rotates. This cylinder $M'$ may be rotated by any desired mechanism. As herein shown, the shaft of the cylinder is provided with a toothed wheel O. Two arms $O'$ O² are movably connected with the shaft carrying said wheel and are provided with pawls O³ O⁴, adapted to engage the teeth of said wheel. These arms are connected with the cam-lever O⁵ by the connecting-rods O⁶. The cam-lever is provided with a slot O⁷, which engages a projection or pin O⁸ on the wheel O⁹, which is fixed to the shaft I. It will be seen that as said wheel rotates the cam-lever is moved up and down, so as to move the connecting-rods and the arms O' O² up and down. The pawl on the arm O' engages the teeth of the wheel O in the upward movement, so as to move said wheel forward a predetermined distance, while the pawl on the arm O² engages said wheel on the downward movement, so as to move it forward a predetermined amount. It will thus be seen that by this arrangement I obtain a double movement, as it were, of the feeding-cylinder during each operation of the cam-lever O⁵.

The plungers or compressors E are provided near their ends with the holes E⁹. (See Fig. 19.) These holes are so located that when the plungers or compressors first enter the grooves E' said holes will be opposite the pins B¹⁷, which control the engaging flaps B⁶. The sides of the box at this point are unfolded. It will further be noted by referring to Fig. 2 that these grooves have a short beveled face E⁸, which the compressors or plungers engage, so as to be slightly moved inwardly before the sides of the box are closed in order to remove the holes E⁹ from opposite the pins B¹⁷. (See Fig. 19.) The offsets E⁴ are made of such length that the outer ends are in line with the faces of the grooves E' at the forward end of the table. When the compressors pass these offsets, therefore, they are moved outwardly their full length, so that the pins B¹⁷ come opposite the holes E⁹, thus releasing the holding-flaps B⁶ before the sides of the box are opened. This releases the holding-flaps on the sides at practically the same time they are released on the bottom, thus freeing the package, so that it may be at once removed from the box.

I have described in detail the various constructions employed in the machine herein illustrated; but it is of course evident that the result desired may be attained by various mechanisms different from those I have shown, and I therefore do not limit myself to the form, construction, and arrangement of the parts set forth in the drawings, for many of these parts may be greatly varried, some omitted, and others used with parts not herein shown without in any manner departing from the spirit of my invention, all of which will readily occur to those versed in the art.

The use and operation of my device are as follows:

From the foregoing description the operation of my device will be readily understood and, briefly, may be stated as follows: The wrapper to be used, whether of paper or other material, is placed in the box when said box is flattened out in the position shown in Fig. 23. The holding devices or flaps B⁵ are next actuated, so as to grip the wrapper at the bottom of the box. As the box advances along the table the rollers on the end of the arm D engage the cam-face D⁹, so as to actuate the parts connected therewith and close the sides of the box before it reaches the feeding devices. This position of the parts is illustrated in Fig. 24. When the sides of the box are closed, the holding devices or flaps B⁶ are closed, so as to grip the ends of the wrapper on the sides of the box. The box is now beneath the feeding mechanism and is ready to receive the material. One of the pins M¹¹ when the parts are in this position has engaged the lever M⁹ and moved the extension downwardly and opened the bottom of the chute, so that the parts are in the position shown in Fig. 3, the material in the chute being suddenly discharged into the box. As the box advances the roller F engages the upper edge of the wrapper lying on the top of the box and covers it with adhesive material. The box now moves forward and the extension M⁵ of the chute is moved upward and the bottom closed. The flat strips G are now moved downward and one edge of the wrapper folded over upon the material by the folding-flap B⁷. The other edge of the wrapper is now folded over by the lever I⁶, as shown in Fig. 25. The box then passes beneath the stationary piece I¹⁰ and is completely and tightly closed. The plungers are then moved inwardly so as to compress the material in a solid compact mass within the wrapper, thus giving it a form which it will retain after being removed from the box. The plungers are then removed, the box opened, the flat strips G moved out of the way, the devices which engage the wrapper released, and the package removed therefrom. The box then passes beneath the table and back to the initial position (shown in Fig. 1) and is then ready to receive a new charge.

It will thus be seen that I have here a construction for wrapping in neat commercial packages material which has no form of itself, such as dried fruit, and which it has been heretofore impracticable to wrap. It will further be seen that by this device I am able to wrap such material in neat commercial packages and by weighing the amount fed into the box each time I may form such packages of a uniform weight, so that they may be put upon the shelves and sold without further handling of any kind. This makes it convenient to handle such material and also prevents it from being exposed to the dust, dirt, and other deleterious agencies. If, for example, it is desired to wrap the material in pound packages, a pound of the material would be inserted in the box each time, while if larger packages are desired a larger amount would be placed in said box. These details can be readily arranged and will of course depend upon the conditions to be met.

I claim—

1. A device for wrapping loose material comprising a receptacle made of parts hinged together and adapted to be flattened to receive the wrapper, engaging devices associated with said receptacle and adapted to engage said wrapper and hold it in place, means for folding the parts of said receptacle so as to form a box containing the wrapper into which the material may be placed, and a compressing device for compressing said material in the wrapper so as to give it a compact form.

2. A device for wrapping loose material comprising a receptacle in which the wrapper is received, a compressing device comprising two plungers adapted to be inserted within the wrapper one at each end so as to compress the loose material therein.

3. A device for wrapping loose material comprising a receptacle into which the wrapper and the material are received, a folding device for folding the edges of the wrapper after the material is placed therein and a compressing device for compressing said material into a compact mass after the edges of the wrapper are folded.

4. A wrapping-machine comprising a folding device for folding the edges of the wrapper after the material is placed therein, a compressor that compresses the material while in the wrapper, and after the edges are folded and engaging devices adapted to engage the wrapper while the material is being compressed, and hold said wrapper in place.

5. A wrapping-machine, comprising a receptacle made up of four hinged sides or parts adapted to be opened to form a substantially flat receiving-surface to receive the wrapper, means for folding three of the said parts together to form a tube-like receptacle open at the ends and top, means for introducing the material to be wrapped through the top and then folding the top, and means for folding the wrapper on the material at the ends to form the package.

6. A wrapping-machine comprising a receptacle made up of hinged parts and adapted to be opened to receive the wrapper, means for folding said receptacle after the wrapper is in position, and suitable holding devices for engaging said wrapper before the material is placed in the receptacle so as to leave the space within the receptacle free for the material to be wrapped.

7. A wrapping-machine comprising a table, one or more receptacles adapted to be moved therealong, each of said receptacles made up of hinged parts and adapted to be flattened out to receive the wrapper and then folded after the wrapper is in place, a projecting part on said receptacle adapted to engage a part on said table so as to fold the sides of the receptacle in position to receive the material.

8. A wrapping-machine comprising a table, one or more receptacles adapted to be moved therealong, each of said receptacles made up of hinged parts and adapted to be flattened out to receive the wrapper and then folded, a projecting part on said receptacle adapted to engage said table so as to hold the receptacle in a partly-folded position to receive the material, a device for applying adhesive material to one edge of said wrapper, and a closing device for closing the lid of the receptacle after the material is placed therein.

9. A wrapping-machine comprising a table, one or more boxes adapted to be moved therealong, said boxes each consisting of a series of parts hinged together so that they may be flattened out to receive the wrapper, engaging devices associated with the bottom of the box to grip said wrapper before the box is folded, a folding mechanism associated with the sides of the box and adapted to move them to a position at an angle with the bottom, holding devices associated with said sides and adapted to grip the wrapper when the sides are folded, and a folding-flap at one edge of the box adapted to fold one edge of the wrapper, the other edge of the wrapper being folded over by the closing of the box-lid.

10. A wrapping-machine comprising a table, one or more boxes adapted to be moved therealong, said boxes each consisting of a series of parts hinged together so that they may be flattened out to receive the wrapper, engaging devices associated with the bottom of the box to grip said wrapper before the box is folded, a folding mechanism associated with the sides of the box and adapted to move them upwardly to a position at an angle with the bottom, holding devices associated with said sides and adapted to grip the wrapper when the sides are folded, a folding-flap at one edge of the box adapted to fold one edge of the wrapper, the other edge of the wrapper being folded over by the closing of the box-lid, and compressing devices adapted to be inserted within the wrapper so as to compress the material while in the wrapper.

11. A wrapping-machine comprising a table, one or more boxes adapted to be moved therealong, said boxes each consisting of a series of parts hinged together so that they may be flattened out to receive the wrapper, engaging devices associated with the bottom of the box to grip said wrapper before the box is folded, a folding mechanism associated with the sides of the box and adapted to move them upwardly to a position at an angle with the bottom, holding devices associated with said sides and adapted to grip the wrapper when the sides are folded, a folding-flap at one edge of the box adapted to fold one edge of the wrapper, the other edge of the wrapper being folded over by the closing of the box-lid, and compressing devices adapted to be inserted within the wrapper so as to compress the material while in the wrapper, said compressing devices comprising two plungers forced inwardly by engaging cam-faces on said table.

12. A wrapping-machine, comprising a table, one or more boxes adapted to be moved therealong, said boxes each consisting of a series of parts hinged together so that they may be flattened out to receive the wrapper and folded after the wrapper is in place, engaging parts on each of said boxes adapted to engage the table when the box is moved forward, so as to vary the relative position of the parts of the box in a predetermined manner.

13. A wrapping-machine, comprising a table, one or more boxes open at the end adapted to be moved therealong and into which the material to be wrapped is received, a plunger adapted to be received in each end of the box, engaging faces on the table adapted to engage said plungers and force them inwardly toward each other at a predetermined time so as to compress the material in the box.

14. A wrapping-machine, comprising a table, one or more boxes adapted to be moved therealong, said boxes each consisting of a series of parts hinged together so that they may be flattened out to receive the wrapper, engaging devices associated with the box and adapted to grip the wrapper, controlling devices for varying the relative position of the parts of said box, said engaging devices and controlling devices actuated by the engagement with the parts of the table during the forward movement of the box.

15. A wrapping-machine, comprising a table, one or more boxes adapted to be moved therealong, said boxes each consisting of a series of parts hinged together so that they may be flattened out to receive the wrapper, engaging devices associated with the box and adapted to grip the wrapper, controlling devices for varying the relative position of the parts of said box, said engaging devices and controlling devices actuated by the engagement with the parts of the table during the forward movement of the box, and compressing devices associated with each box and adapted when actuated to compress the material therein.

16. A wrapping-machine, comprising a table, one or more boxes adapted to be moved therealong, said boxes each consisting of a series of parts hinged together so that they may be flattened out to receive the wrapper, means for folding the parts about the material after the wrapper is in position, and a removable part or parts adapted to be inserted between the folded edges of the wrapper and the material in the box.

17. A wrapping-machine, comprising a receptacle made up of a series of parts hinged together so that they may be flattened out to receive the wrapper in a flat position, a folding mechanism associated with the sides of the receptacle and adapted to fold them, a feeding device adapted to deposit a predetermined amount of material in said receptacle after the sides are folded, and a closing device for closing the top of the receptacle.

18. A wrapping-machine, comprising a receptacle made up of a series of parts hinged together so that they may be flattened out to receive the wrapper, a folding mechanism associated with the sides of the receptacle and adapted to fold them, a feeding device adapted to deposit a predetermined amount of material in said receptacle after the sides are folded, a closing device for closing the top of the receptacle, an arm associated with said top and provided with a part which engages one of the sides of the receptacle, and means for depressing said arm so as to bind the several parts of the receptacle together.

19. A device for wrapping loose material, comprising a receptacle made of parts hinged together and adapted to be flattened out to receive the wrapper, engaging devices associated with the bottom of said receptacle and adapted to engage said wrapper before the parts are folded to receive the material, means for folding the sides of said receptacle so that the material may be inserted therein, engaging devices associated with said sides for engaging said wrapper after the sides are folded.

20. A device for wrapping loose material, comprising a receptacle made of parts hinged together and adapted to be flattened out to receive the wrapper, engaging devices associated with the bottom of said receptacle and adapted to engage said wrapper before the parts are folded to receive the material, means for folding the sides of said receptacle so that the material may be inserted therein, engaging devices associated with said sides for engaging said wrapper after the sides are folded, means for closing the top of said receptacle after the material is in place, and a compressing device adapted to compress the material in the wrapper.

21. A wrapping-machine, comprising a table, one or more boxes adapted to be moved therealong, said boxes each consisting of a series of parts hinged together so that they may be flattened out to receive the wrapper, engaging devices adapted to grip said wrapper and hold it in position, a feeding device for depositing the material to be wrapped in the box, a compressing device associated with said box and comprising two reciprocating parts adapted to be forced into said box so as to compress said material, and a retracting device associated with each of said reciprocating parts.

22. A wrapping-machine, comprising a table, one or more boxes adapted to be moved therealong, said boxes each consisting of a series of parts hinged together so that they may be flattened out to receive the wrapper, a folding mechanism associated with the sides of said box and adapted to fold them before the material is received therein, a device for closing the lid of said box comprising a pivoted arm associated with said table and provided with actuating mechanism which moves it when the box is in a predetermined position so as to engage the lid and move it to a closed position.

23. A feeding device for wrapping-machines, comprising a passage-way or chute into which quantities of the material to be wrapped are discharged, an extension associated with said chute or passage-way and adapted to be folded, said extension having attached thereto a device for applying adhesive material to the edges of the wrappers used in said machine.

24. A wrapping-machine, comprising a table, one or more boxes adapted to be moved therealong, said boxes each consisting of a series of parts hinged together so that they may be flattened out to receive the wrapper, one or more engaging flaps associated with the bottom of said box and having parts connected therewith which engage the table at a predetermined time, so as to move said flap or flaps in contact with the wrapper, an arm connected with the sides of said box and adapted to engage an inclined face on said table so as to move the sides of said box to a closed position to receive the material, one or more flaps associated with said sides and adapted to be moved when the sides are closed so as to grip the sides of the wrapper and hold it in position, an adhesive-applying device adapted to apply adhesive material to one edge of the wrapper, a folding-flap for folding down one edge of the wrapper, and means for closing the lid of the box so as to fold the other edge of the wrapper.

25. A wrapping-machine, comprising a table, one or more boxes adapted to be moved therealong, said boxes each consisting of a series of parts hinged together so that they may be flattened out to receive the wrapper, one or more engaging flaps associated with the bottom of said box and having parts connected therewith which engage the table at a predetermined time, so as to move said flap or flaps in contact with the wrapper, an arm connected with the sides of said box and adapted to engage an inclined face on said table so as to move the sides of said box to a closed position to receive the material, one or more flaps associated with said sides and adapted to be moved when the sides are closed so as to grip the sides of the wrapper and hold it in position, an adhesive-applying device adapted to apply adhesive material to one edge of the wrapper, a feeding device for feeding material into said box, one or more flat pieces adapted to be folded down upon said material, a folding-flap for folding down one edge of the wrapper, means for closing the lid of said box so as to fold the other edge of said wrapper, and a reciprocating plunger at each end of said box adapted to be forced inwardly after the box is closed so as to compress the material therein.

26. A wrapping-machine, comprising a table, one or more boxes adapted to be moved therealong, said boxes each consisting of a series of parts hinged together so that they may be flattened out to receive the wrapper, a series of grooves associated with said table and provided with inclined faces, a series of projections associated with said parts and engaging said grooves, the relative position of the parts of the box being controlled by the engagement of said projections with the inclined faces of the grooves.

27. A wrapping-machine, comprising a table, one or more boxes adapted to be moved therealong, each box consisting of a series of parts hinged together so that they may be flattened out to receive the wrapper, engaging devices associated with said box and adapted to engage said wrapper and hold it in place, a folding mechanism for folding the parts of said box, a compressing device for compressing the material in the box, the several parts adapted to be actuated at a predetermined point so as to unfold the box and release the wrapper.

28. A wrapping-machine, comprising a receptacle made up of hinged parts adapted to be opened to form a substantially flat receiving-surface for the wrapper, means for folding some of the hinged parts into position so as to form a hollow uninterrupted receptacle lined by the wrapper, means for introducing the material to be wrapped into said receptacle and against the wrapper, and means for then folding the remaining hinged part to complete the receptacle, and means for folding the ends of the wrapper to form the package.

29. A wrapping-machine, comprising a receptacle made up of hinged parts adapted to be opened to form a substantially flat receiving-surface for the wrapper, means for folding some of the hinged parts together to form a receptacle, means for introducing the material to be wrapped into the receptacle so formed through the space left by the unfolded hinged part, means for then folding such hinged part to close such space, means for then compressing the substance within the receptacle directly against the wrapper, and means for then completing the folding of the wrapper to form the package.

30. A wrapping-machine, comprising a receptacle made up of hinged parts adapted to be opened to form a substantially flat receiving-surface for the wrapper, means for folding some of the hinged parts together to form a receptacle, means for introducing the material to be wrapped into the receptacle so formed through the space left by the unfolded hinged part, means for then folding such hinged part to close such space, means for then compressing the substance within the receptacle directly against the wrapper said means including plungers operated toward each other at each end of the receptacle, and means for then folding the wrapper to complete the package.

OLOF N. NORD.

Witnesses:
 DONALD M. CARTER,
 HOMER L. KRAFT.